US010608810B2

(12) United States Patent
Liu et al.

(10) Patent No.: US 10,608,810 B2
(45) Date of Patent: Mar. 31, 2020

(54) TECHNIQUES AND APPARATUSES FOR SYNCHRONIZATION DESIGN

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 63 days.

(21) Appl. No.: 16/020,718

(22) Filed: Jun. 27, 2018

(65) Prior Publication Data
US 2019/0109700 A1 Apr. 11, 2019

Related U.S. Application Data

(60) Provisional application No. 62/569,415, filed on Oct. 6, 2017.

(51) Int. Cl.
H04L 7/10 (2006.01)
H04L 27/26 (2006.01)
H04L 7/04 (2006.01)
H04W 56/00 (2009.01)
H04W 72/04 (2009.01)

(52) U.S. Cl.
CPC ............. H04L 7/10 (2013.01); H04L 7/041 (2013.01); H04L 27/2613 (2013.01); H04L 27/2662 (2013.01); H04L 27/2692 (2013.01); H04W 56/0015 (2013.01); H04W 72/042 (2013.01)

(58) Field of Classification Search
None
See application file for complete search history.

(56) References Cited

U.S. PATENT DOCUMENTS

| 10,362,610 B2 * | 7/2019 | Chen ..................... H04L 5/0048 |
| 2010/0284483 A1 * | 11/2010 | Jongren .............. H04B 7/0697 375/267 |
| 2014/0198772 A1 * | 7/2014 | Baldemair .......... H04L 27/2655 370/335 |
| 2014/0301310 A1 * | 10/2014 | Kuo ..................... H04B 7/0626 370/329 |

(Continued)

FOREIGN PATENT DOCUMENTS

WO   WO-2017014602 A1   1/2017

OTHER PUBLICATIONS

International Search Report and Written Opinion—PCT/US2018/051525—ISA/EPO—dated Dec. 11, 2018.

*Primary Examiner* — Brian S Roberts
(74) *Attorney, Agent, or Firm* — Nerrie M. Zohn

(57) ABSTRACT

Some techniques and apparatuses described herein provide bandwidth, coverage extension/repetition schemes, and synchronization signal burst set periodicities for low-cost UEs. For example, some techniques and apparatuses described herein provide particular repetition resources within a broadcast channel and/or synchronization signal block, particular repetition resources in consecutive slots, and/or the like. Furthermore, some techniques and apparatuses described herein define minimum bandwidths of low-cost UEs in relation to non-low-cost UEs, and define synchronization signal burst set periodicities that may be different for low-cost UEs than for non-low-cost UEs.

30 Claims, 12 Drawing Sheets

(56) References Cited

U.S. PATENT DOCUMENTS

| | | |
|---|---|---|
| 2017/0094624 A1 | 3/2017 | Balachandran et al. |
| 2018/0145819 A1* | 5/2018 | Axmon .................... H04L 5/16 |
| 2018/0241495 A1 | 8/2018 | Xue et al. |
| 2019/0044690 A1* | 2/2019 | Yi ............................. H04L 5/14 |
| 2019/0090219 A1* | 3/2019 | Lee .................... H04W 74/006 |

* cited by examiner

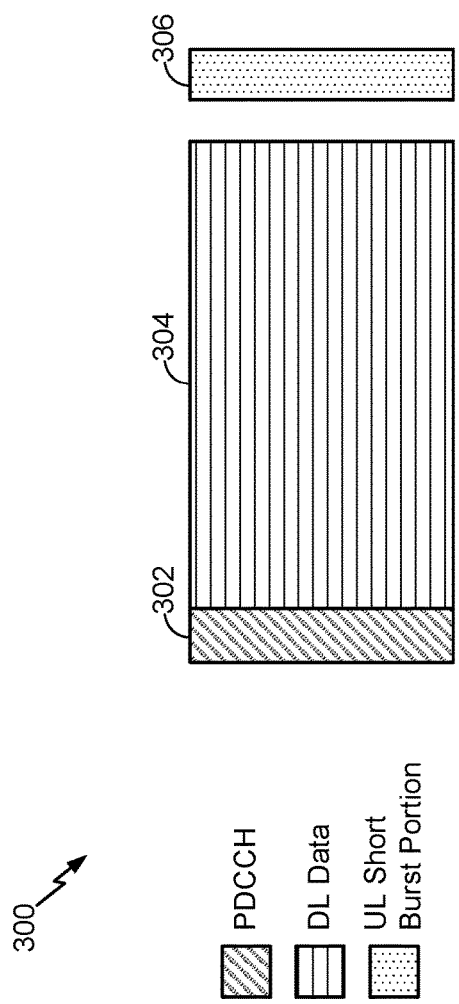
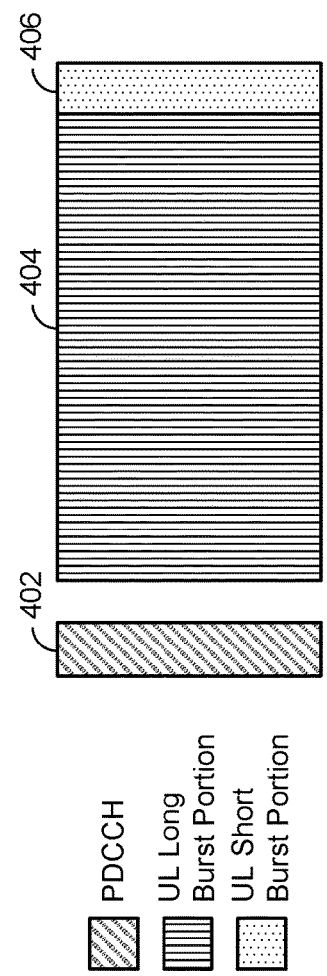
FIG. 3
FIG. 4

FIG. 6

TECHNIQUES AND APPARATUSES FOR SYNCHRONIZATION DESIGN

CROSS-REFERENCE TO RELATED APPLICATIONS UNDER 35 U.S.C. § 119

This application claims priority to Provisional Patent Application No. 62/569,415, filed on Oct. 6, 2017, entitled "TECHNIQUES AND APPARATUSES FOR SYNCHRONIZATION DESIGN FOR 5G MACHINE TYPE COMMUNICATION USER EQUIPMENT," which is hereby expressly incorporated by reference herein.

BACKGROUND

Field

Aspects of the present disclosure generally relate to wireless communication, and more particularly to techniques and apparatuses for synchronization design.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

Low-cost and/or low-power UEs provide many benefits in certain applications, such as machine type communication (MTC) applications, Internet of Things (IoT) applications, and/or the like. One type of low-cost UE is the enhanced MTC (eMTC) UE, which is being implemented using the LTE radio access technology. The eMTC UE may use a single antenna, a narrow bandwidth, and a small transport block size. Furthermore, the eMTC UE may use certain power saving techniques, such as a power saving mode (PSM), an extended discontinuous reception (eDRX) cycle, and a transmission time interval (TTI) bundling technique for coverage extension.

SUMMARY

The adoption of a low-power and/or low-cost communication structure in 5G may provide many benefits. For example, adopting eMTC or an approach similar to eMTC may provide increased coverage, a flexible data rate for low-power UEs, lower power consumption, and lower cost. However, there may be challenges with implementing an approach similar to eMTC. For example, atypical broadcast channel (e.g., physical broadcast channel (PBCH)) and/or synchronization scheme for 5G may not provide sufficient coverage extension for eMTC devices in the 5G band. As another example, bandwidths of eMTC devices can potentially be different than bandwidths of non-MTC devices (e.g., 5G/NR devices). As a third example, synchronization signal burst set periodicities of MTC devices can be different than those of non-MTC devices.

Some techniques and apparatuses described herein provide bandwidth, coverage extension/repetition schemes, and synchronization signal burst set periodicities for 5G low-cost UEs. For example, some techniques and apparatuses described herein provide particular repetition resources within a broadcast channel and/or synchronization signal block, particular repetition resources in consecutive slots, and/or the like. Furthermore, some techniques and apparatuses described herein define minimum bandwidths of 5G low-cost UEs in relation to non-low-cost UEs, and define synchronization signal burst set periodicities that may be different for 5G low-cost UEs than for non-low-cost UEs. In this way, implementation of 5G MTC-like UEs is enabled, thereby providing cost and power savings, increasing efficiency of network resources, and improving versatility of the 5G network. While some aspects described herein are described in the context of MTC UEs, aspects are not so limited, and may be applied for any low-cost UE, such as an eMTC UE, an IoT UE, an NB-IoT UE, and so on.

In an aspect of the disclosure, a method, an apparatus, a low-cost UE, a base station, and a computer program product are provided.

In some aspects, the method may be performed by a low-cost UE and may include receiving a transmission of a broadcast channel and/or synchronization signal in at least one first resource of a broadcast channel and/or synchronization signal block; and receiving at least one repetition of the broadcast channel and/or synchronization signal in at least one second resource, wherein the at least one second resource is included in a slot with the broadcast channel and/or synchronization signal block, and wherein the at least one second resource is a configured resource.

In some aspects, the low-cost UE may include a memory and at least one processor coupled to the memory. The at least one processor may be configured to receive a transmission of a broadcast channel and/or synchronization signal in at least one first resource of a broadcast channel and/or synchronization signal block; and receive at least one repetition of the broadcast channel and/or synchronization signal in at least one second resource, wherein the at least one second resource is included in a slot with the broadcast channel and/or synchronization signal block, and wherein the at least one second resource is a configured resource.

In some aspects, the apparatus may include means for receiving a transmission of a broadcast channel and/or synchronization signal in at least one first resource of a broadcast channel and/or synchronization signal block; and means for receiving at least one repetition of the broadcast channel and/or synchronization signal in at least one second resource, wherein the at least one second resource is included in a slot with the broadcast channel and/or synchronization signal block, and wherein the at least one second resource is a configured resource.

In some aspects, the computer program product may include a non-transitory computer-readable medium storing computer executable code. The code may include code for receiving a transmission of a broadcast channel and/or synchronization signal in at least one first resource of a broadcast channel and/or synchronization signal block; and code for receiving at least one repetition of the broadcast channel and/or synchronization signal in at least one second resource, wherein the at least one second resource is included in a slot with the broadcast channel and/or synchronization signal block, and wherein the at least one second resource is a configured resource.

In some aspects, the method may be performed by the base station, and may include transmitting, for a low-cost UE, a transmission of a broadcast channel and/or synchronization signal in at least one first resource of a broadcast channel and/or synchronization signal block; and transmitting, for the low-cost UE, at least one repetition of the broadcast channel and/or synchronization signal in at least one second resource, wherein the at least one second resource is included in a slot with the broadcast channel and/or synchronization signal block, and wherein the at least one second resource is a configured resource.

In some aspects, the base station may include a memory and at least one processor coupled to the memory. The at least one processor may be configured to transmit a transmission of a broadcast channel and/or synchronization signal in at least one first resource of a broadcast channel and/or synchronization signal block; and transmit at least one repetition of the broadcast channel and/or synchronization signal in at least one second resource, wherein the at least one second resource is included in a slot with the broadcast channel and/or synchronization signal block, and wherein the at least one second resource is a configured resource.

In some aspects, the apparatus may include means for transmitting, for a low-cost UE, a transmission of a broadcast channel and/or synchronization signal in at least one first resource of a broadcast channel and/or synchronization signal block; and means for transmitting, for the low-cost UE, at least one repetition of the broadcast channel and/or synchronization signal in at least one second resource, wherein the at least one second resource is included in a slot with the broadcast channel and/or synchronization signal block, and wherein the at least one second resource is a configured resource.

In some aspects, the computer program product may include a non-transitory computer-readable medium storing computer executable code. The code may include code for transmitting, for a low-cost UE, a transmission of a broadcast channel and/or synchronization signal in at least one first resource of a broadcast channel and/or synchronization signal block; and code for transmitting, for the low-cost UE, at least one repetition of the broadcast channel and/or synchronization signal in at least one second resource, wherein the at least one second resource is included in a slot with the broadcast channel and/or synchronization signal block, and wherein the at least one second resource is a configured resource.

Aspects generally include a method, apparatus, system, computer program product, non-transitory computer-readable medium, user equipment, wireless communication device, base station, low-cost UE, and processing system as substantially described herein with reference to and as illustrated by the accompanying drawings, specification, and appendices (if present).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 3 is a diagram illustrating an example of a downlink (DL)-centric wireless communication structure.

FIG. 4 is a diagram illustrating an example of an uplink (UL)-centric wireless communication structure.

FIG. 6 is a diagram illustrating another example of broadcast channel block design.

DETAILED DESCRIPTION

Figure 1:
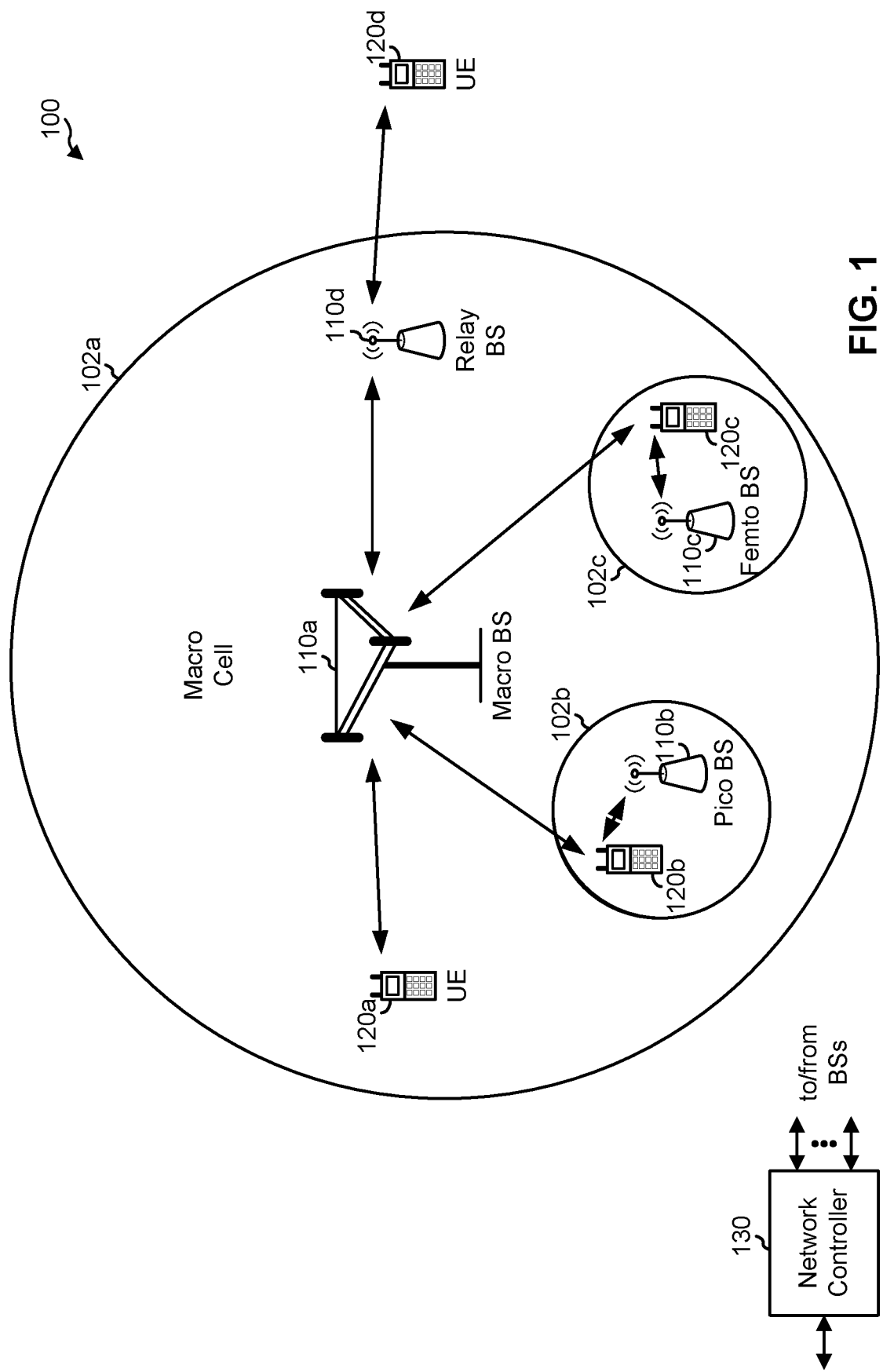
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. Using the techniques and apparatuses described herein, a 5G or NR communication structure for synchronization and initial access of such MTC and eMTC devices may be achieved. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some cases herein, a low-cost UE is described. In some aspects, the low-cost UE may include an MTC UE, an eMTC UE, an IoT UE, and/or the like. A non-low-cost UE may include a UE that is configured to communicate using a predefined numerology associated with 5G/NR, such as a 5G UE.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed. 5G RAT networks may have more flexible bandwidth, slot size, and subcarrier spacing, which may be collectively termed numerology.

Techniques and apparatuses described herein may provide for communication with a low-cost UE using a 5G RAT network by transmitting a transmission of a broadcast channel and/or synchronization signal in at least one first resource of a broadcast channel and/or synchronization signal block, and transmitting, for the low-cost UE, at least one repetition of the broadcast channel and/or synchronization signal in at least one second resource, wherein the at least one second resource is included in a slot with the broadcast channel and/or synchronization signal block, and wherein the at least one second resource is a configured resource.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
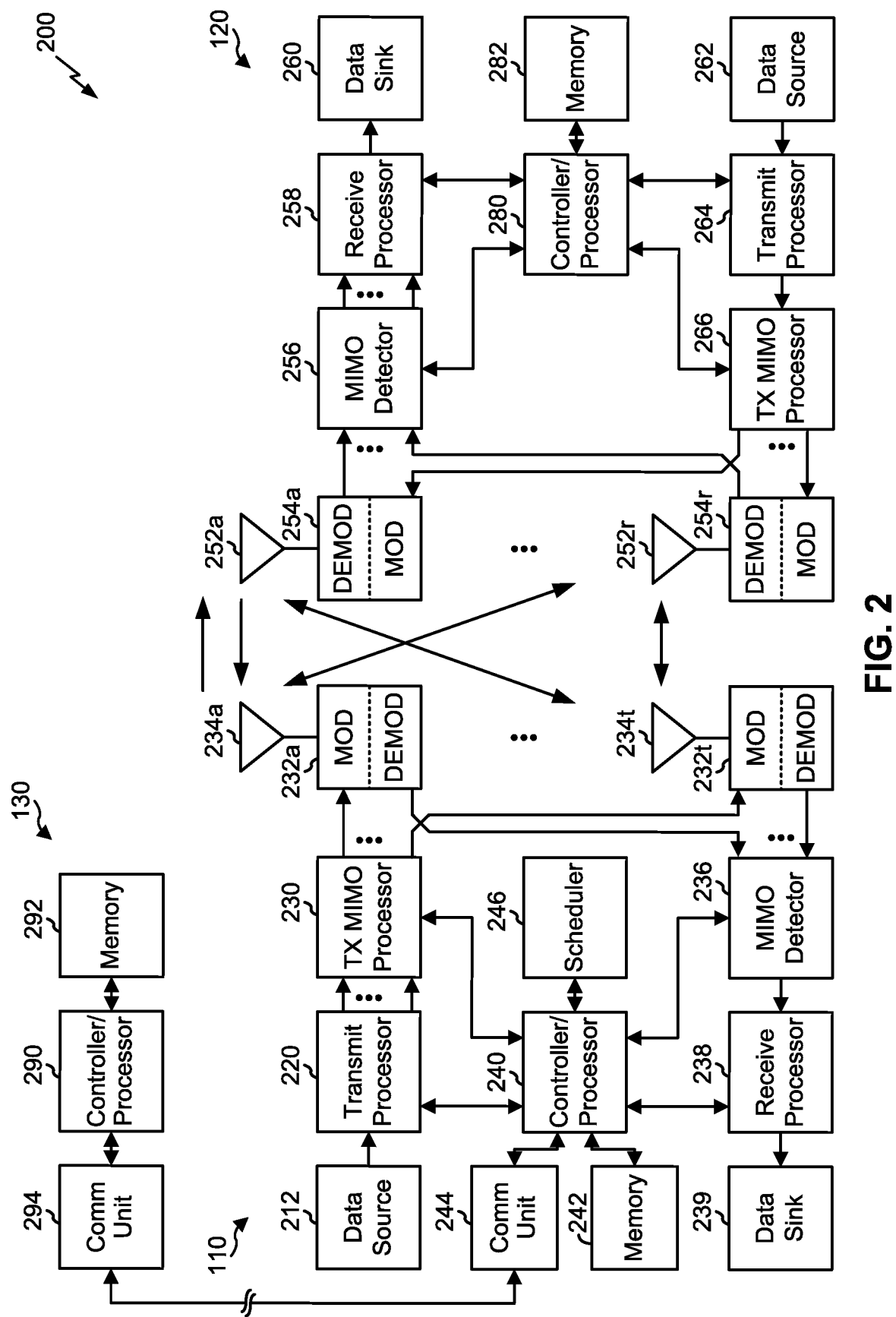
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals and/or a physical broadcast channel may be retransmitted on one or more occasion and/or may have a particular bandwidth to enable communication with low-cost UEs using the 5G network.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronization signaling and/or bandwidth selection for a low-cost UE, as described in more detail elsewhere herein. For example, controller/processor 240 of base station 110, controller/processor 280 of UE 120, and/or any other component(s) of FIG. 2 may perform or direct operations of, for example, method 800 of FIG. 8, method 900 of FIG. 9, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or single carrier frequency-division multiplexing (SC-FDM) on the uplink, may utilize CP-OFDM on the downlink and include support for half-duplex operation using time division duplexing (TDD). In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The radio access network (RAN) may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

FIG. 3 is a diagram 300 showing an example of a DL-centric subframe or wireless communication structure.

The DL-centric subframe may include a control portion 302. The control portion 302 may exist in the initial or beginning portion of the DL-centric subframe. The control portion 302 may include various scheduling information and/or control information corresponding to various portions of the DL-centric subframe. In some configurations, the control portion 302 may be a physical DL control channel (PDCCH), as indicated in FIG. 3.

The DL-centric subframe may also include a DL data portion 304. The DL data portion 304 may sometimes be referred to as the payload of the DL-centric subframe. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH). In some aspects, the DL data portion 304 may include one or more transmissions of a synchronization signal and/or a PBCH (e.g., associated with a synchronization signal block or an SS/PBCH block).

The DL-centric subframe may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric subframe. For example, the UL short burst portion 306 may include feedback information corresponding to the control portion 302 and/or the data portion 304. Non-limiting examples of information that may be included in the UL short burst portion 306 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 3 is provided merely as an example. Other examples are possible and may differ from what was described with regard to FIG. 3.

FIG. 4 is a diagram 400 showing an example of an UL-centric subframe or wireless communication structure. The UL-centric subframe may include a control portion 402. The control portion 402 may exist in the initial or beginning portion of the UL-centric subframe. The control portion 402 in FIG. 4 may be similar to the control portion 302 described above with reference to FIG. 3. In some configurations, the control portion 402 may be a physical DL control channel (PDCCH).

The UL-centric subframe may also include an UL long burst portion 404. The UL long burst portion 404 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 406. The UL short burst portion 406 in FIG. 4 may be similar to the UL short burst portion 306 described above with reference to FIG. 3, and may include any of the information described above in connection with FIG. 3. The foregoing is merely one example of an UL-centric wireless communication structure and alternative structures having similar features may exist without necessarily deviating from the aspects described herein.

As indicated above, FIG. 4 is provided merely as an example. Other examples are possible and may differ from what was described with regard to FIG. 4.

Figure 5:
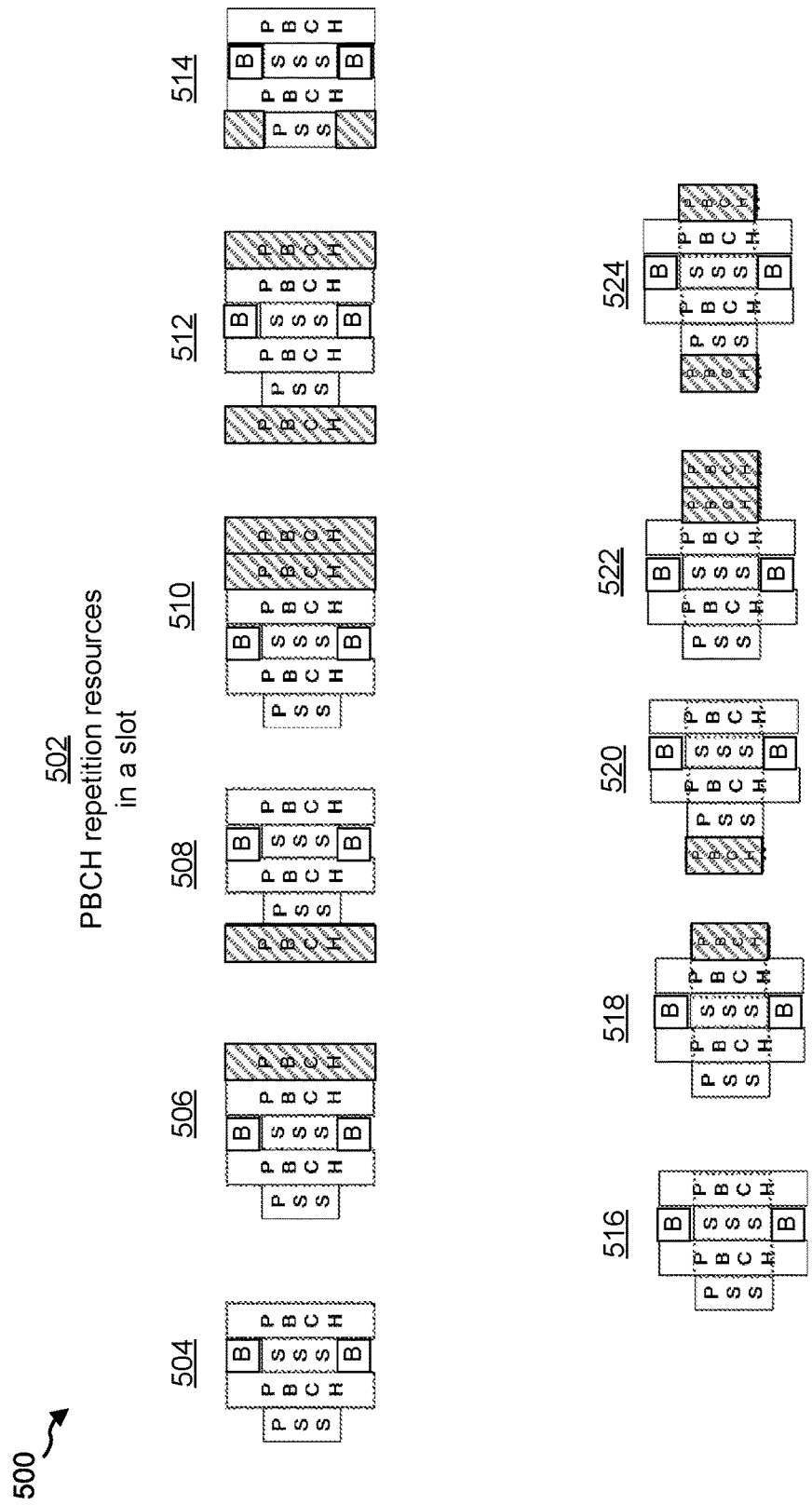
FIG. 5 is a diagram illustrating an example of broadcast channel block design.
Figure 7:
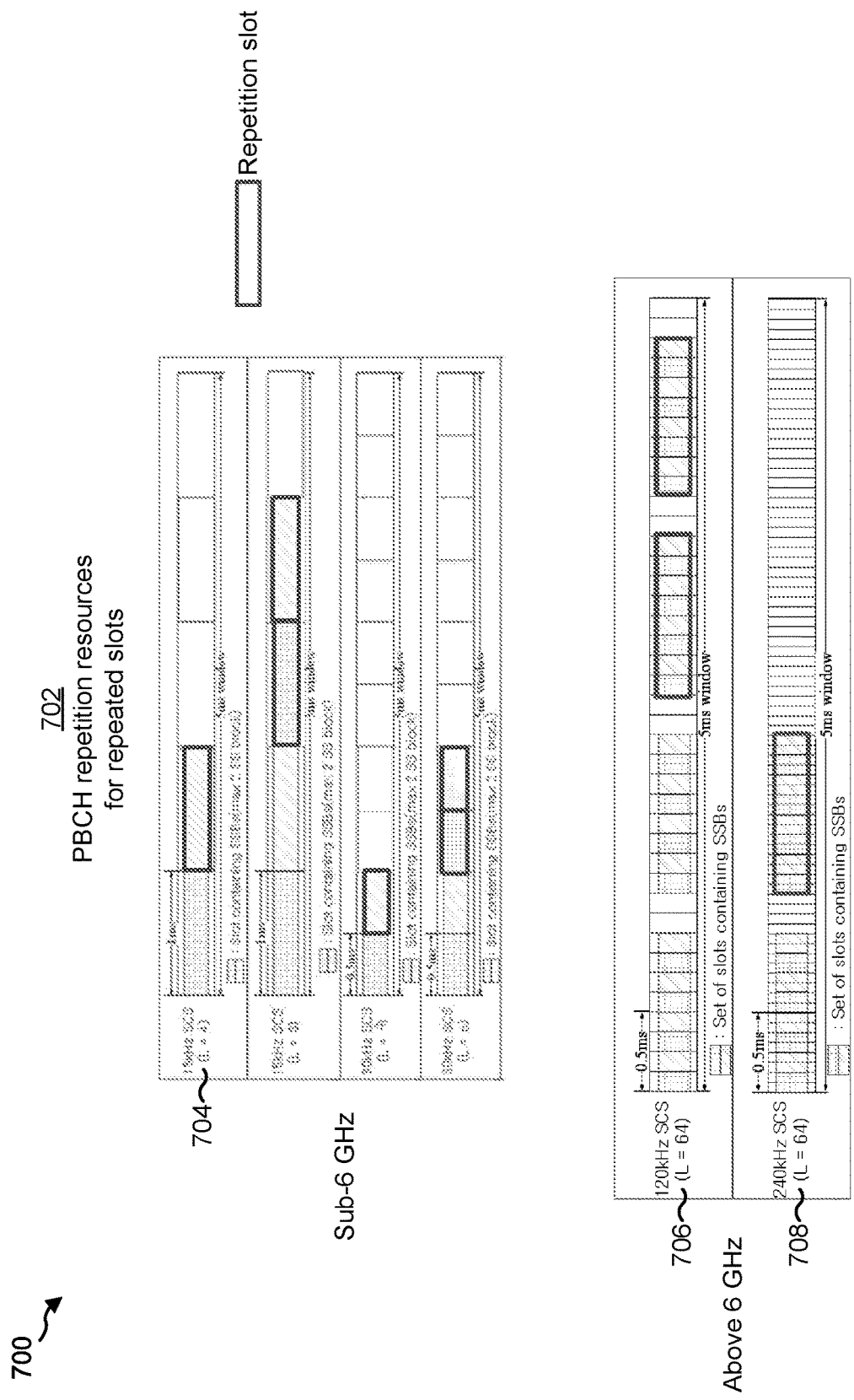
FIG. 7 is a diagram illustrating an example of slot selection for retransmission of a broadcast channel and/or synchronization signal.

FIG. 5 is a diagram illustrating examples 500 of broadcast channel block designs. As shown by reference number 502, the examples 500 pertain to PBCH repetition resources of an SS/PBCH block, which may be within a single slot. In some cases, an SS/PBCH block is referred to herein as a synchronization signal block. For example, a BS 110 may transmit one or more repetitions of a PBCH for a low-cost UE 120 to provide coverage extension. Examples 500 show particular resources of an SS/PBCH block in which the one or more repetitions may be transmitted. For example, reference numbers 504 through 514 show PBCH blocks for a bandwidth of 20 resource blocks (RBs), and reference numbers 516, 518, 520, 522, and 524 show PBCH blocks for a bandwidth of 12 RBs. FIG. 7, as described below, shows examples of how repetitions of an SS/PBCH block may be transmitted. As used herein, PBCH block is used interchangeably with broadcast channel block, synchronization signal block, SS/PBCH block, broadcast channel or synchronization signal block, and broadcast channel and/or synchronization signal block. In FIG. 5, "B" represents PBCH in the rectangles in which "PBCH" will not fit.

As shown, each SS/PBCH block includes a PSS, an SSS, and one or more PBCHs. Each rectangle of an SS/PBCH block may correspond to a symbol. The SSS for the low-cost UE 120 (e.g., an MTC UE 120, an IoT UE 120, an NB-IoT UE 120, an eMTC UE 120, etc.) may be the same as an SSS for a non-low-cost UE 120. The PSS for the low-cost UE 120 may be different for the low-cost UE 120 than for a non-low-cost UE. For example, the PSS for the low-cost UE 120 may have a same sequence as the SSS, or may have a new sequence, such as a Gold sequence with a different cyclic shift than for a non-MTC or non-IoT UE. The PBCH may be similar to or the same for the low-cost UE 120 as for a non-low-cost UE, and a DMRS of the PBCH may be similar to or the same for the low-cost UE 120 as for a non-low-cost UE. For example, the DMRS in the PBCH symbols may have a same least significant bit (LSB) corresponding to a particular synchronization signal block index of the PBCH.

As shown by reference number 504, in some aspects, a first transmission of a PBCH may be in a first resource after a PSS of an SS/PBCH block, and a second transmission of the PBCH may be in a second resource after an SSS of the SS/PBCH block. The SS/PBCH block shown by reference number 504 may be equivalent to an SS/PBCH block for a non-low-cost UE in 5G within a particular frequency band. In some aspects, a same subcarrier spacing and/or a normal cyclic prefix may be used for the low-cost UE 120 as for a non-low-cost UE in 5G within a particular frequency band, which allows at least partial reuse of the PBCH, PSS, and SSS of the non-low-cost UE.

As shown by reference number 506, in some aspects, a third transmission of the PBCH may be in a third resource after the second resource of the SS/PBCH block. For example, the third transmission may be consecutive with the SS/PBCH block shown by reference number 504.

As shown by reference number 508, in some aspects, a third transmission of the PBCH may be in a third resource before the PSS.

As shown by reference number 510, in some aspects, a third transmission and a fourth transmission of the PBCH may be in a third resource and a fourth resource after the second resource of the SS/PBCH block. For example, the third resource and the fourth resource may be adjacent to each other and consecutive with the SS/PBCH block.

As shown by reference number 512, in some aspects, a third transmission of the PBCH may be in a third resource before the PSS, and a fourth transmission of the PBCH may be in a fourth resource after the second resource.

As shown by reference number 514, in some aspects, a third and/or fourth transmission of the PBCH may use resource elements of one or more symbols. Here, for example, resource elements of symbols shared with the PSS and SSS are used to retransmit the PBCH. The resource elements for a third and/or fourth PBCH may be at the two sides of the PSS/SSS resource elements within the bandwidth of the SS/PBCH block, e.g., 20 RBs.

The SS/PBCH blocks and retransmission resources shown by reference numbers 516 through 524 are substantially similar to those shown by reference numbers 504 through 512, with a narrower bandwidth of 10 RBs in comparison to the 20 RBs of the SS/PBCH blocks shown by reference numbers 504 through 512. The 10 RBs of the SS/PBCH block for low-cost UEs may have the same DC tone as that of 20 RBs for non-low-cost UEs. Therefore, as indicated by the dotted lines in the center half of the PBCH bandwidth, a partial repetition of the PBCH is performed (e.g., the center half of the PBCH).

In some aspects, a slot location and/or symbol location of the SS/PBCH block may be shared with a non-low-cost UE. For example, the same slot location and/or symbol location of the SS/PBCH block may be used for the low-cost UE 120 as for the non-low-cost UE. In some aspects, one or more reserved bits of a PBCH may be used to indicate configuration information for a low-cost UE 120. For example, the configuration information may include system information (e.g., a system information block and/or the like), or similar information.

As indicated above, FIG. 5 is provided as an example. In other examples, the symbol(s) for the additional transmission/repetition of the PBCH may not be consecutive to the legacy SS/PBCH block with the same block index. In other example, the additional transmission/repetition of PBCH may also be an additional transmission/repetition of the SSS and/or an additional transmission of a sequence similar to the PSS with a cyclic shift or a cover code, which may be different from that of non-low-cost UEs. Other examples are possible and may differ from what was described with respect to FIG. 5.

Figure 6:
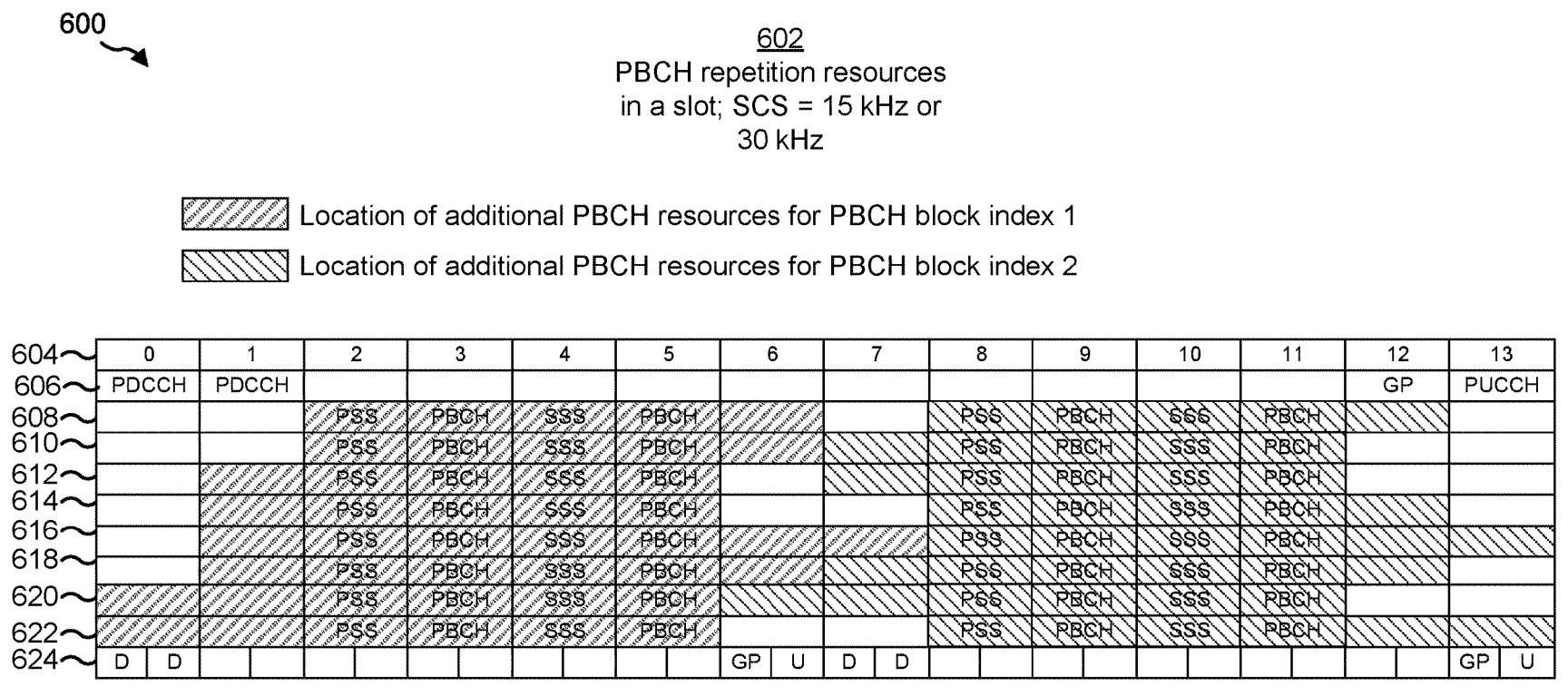

FIG. 6 is a diagram illustrating another example 600 of broadcast channel block design. As shown by reference number 602, example 600 shows PBCH repetition resources within a slot with a subcarrier spacing of 15 kHz or 30 kHz. For example, the locations of PBCH resources for a first SS/PBCH block (e.g., block index 1, of symbol numbers 2 through 5, which may be transmitted by a first beam) are shown using upward diagonal hatching, and the locations of PBCH resources for a second SS/PBCH block (e.g., block index 2, of symbol numbers 8 through 11, which may be transmitted by a second beam) are shown using downward diagonal hatching. As shown by reference number 604, the slot may include symbols 0 through 13. As shown by reference number 606, certain resources of the slot may be used for a control channel and/or a guard period (e.g., symbols 0 and 1 may be used for a downlink control channel, symbol 13 may be used for an uplink control channel, and symbol 12 may be used for a guard period). The resources shown by reference number 606 may be used for non-low-cost UEs (e.g., 5G UEs other than a low-cost UE 120). In some aspects, as described below, one or more of such resources may be used for a PBCH retransmission.

Reference numbers 608 through 622 show different alternatives for retransmission resources for a PBCH. As shown by reference number 608, in some aspects, a symbol immediately following an SS/PBCH block may be used for the retransmission (e.g., symbol 6 for block index 1 and symbol 12 for block index 2). As shown by reference number 610, in some aspects, symbol 6 may be used for retransmission pertaining to block index 1 and symbol 7 may be used for retransmission pertaining to block index 2. As shown by reference number 612, in some aspects, symbol 1 may be used for retransmission pertaining to block index 1 and symbol 7 may be used for retransmission pertaining to block index 2. As shown by reference number 614, in some aspects, symbol 1 may be used for retransmission pertaining to block index 1 and symbol 12 may be used for retransmission pertaining to block index 2. As shown by reference number 616, in some aspects, symbols 6 and 7 may be used for retransmission pertaining to block index 1 and symbols 12 and 13 may be used for retransmission pertaining to block index 2. As shown by reference number 618, in some aspects, symbols 1 and 6 may be used for retransmission pertaining to block index 1 and symbols 7 and 12 may be used for retransmission pertaining to block index 2. As shown by reference number 620, in some aspects, symbols 0 and 1 may be used for retransmission pertaining to block index 1 and symbols 6 and 7 may be used for retransmission pertaining to block index 2. As shown by reference number 622, in some aspects, symbols 0 and 1 may be used for retransmission pertaining to block index 1 and symbols 12 and 13 may be used for retransmission pertaining to block index 2.

Reference number 624 shows symbols/slots for the control/data associated with a 30 kHz subcarrier spacing, which is FDM multiplexed with SS/PBCH blocks associated with a 15 kHz subcarrier spacing. The data with 30 kHz may have half a symbol length of that of SS/PBCH using 15 kHz. Also, the slot duration of 14 symbols may be half of that of SS/PBCH using 15 kHz. The symbol resources indicated by the gray shading of reference number 608 through 622 may be overlapped in time with some control symbols using 30 kHz. For example, the 'D's in reference number 624, denoting the PDCCH symbols using 30 kHz, may collide with the additional PBCH symbol #0 in light gray of the first SS/PBCH block in the reference number 620, 622. The 'D's in reference number 624, denoting the PDCCH symbols using 30 kHz, may collide with the additional PBCH symbol #7 in dark gray of the second SS/PBCH block in the reference number 610, 612, 616, 618, or 620. Similarly, the 'GP' (guard period) and 'U' (PUCCH) symbols with 30 kHz may collide with symbol #6 or 13 with 30 kHz subcarrier spacing. The BS can configure on/off of the additional PBCH that is transmitted for each SS/PBCH block. If the additional PBCH is on, the control signals in the overlapping symbols may not be transmitted; otherwise, the control signals are allowed to the low-cost UEs or non-low-cost UEs. The BS 110 may inform the low-cost UEs whether the additional PBCH is transmitted for each SS/PBCH block or not, according to broadcast signaling, e.g., system information block (SIB) and/or radio resource control (RRC) signaling. The UEs may use the information for rate matching and/or radio resource management measurement.

In 5G, a predefined minimum bandwidth may be used. For example, below 6 GHz frequency, a minimum bandwidth of 5 MHz or 10 MHz may be used. Above 6 GHz, a minimum bandwidth of 50 MHz or 100 MHz may be used. When using a minimum bandwidth of 5 MHz or 10 MHz, a subcarrier spacing and cyclic prefix for the SS/PBCH block of 15 kHz or 30 kHz may be used. When using a minimum bandwidth of 50 MHz or 100 MHz, a subcarrier spacing and cyclic prefix for the SS/PBCH block of 120 kHz or 240 kHz may be used.

At a subcarrier spacing of 30 kHz or 120 kHz, four PBCH blocks provided by four beams can be used to perform synchronization. Various locations of repetition resources for such a case are described in turn below.

In some aspects, symbols 4 through 7 and symbol 12 (used for retransmission) of a first slot may be used for block index 1, symbols 8 through 11 and symbol 13 (used for retransmission) of the first slot may be used for block index 2, symbols 2 through 5 and symbol 10 (used for retransmission) of a second slot may be used for block index 3, and symbols 6 through 9 and symbol 11 (used for retransmission) of the second slot may be used for block index 4.

In some aspects, symbols 4 through 7 and symbol 2 (used for retransmission) of a first slot may be used for block index 1, symbols 8 through 11 and symbol 3 (used for retransmission) of the first slot may be used for block index 2, symbols 2 through 5 and symbol 10 (used for retransmission) of a second slot may be used for block index 3, and symbols 6 through 9 and symbol 11 (used for retransmission) of the second slot may be used for block index 4.

In some aspects, symbols 4 through 7 and symbol 2 (used for retransmission) of a first slot may be used for block index 1, symbols 8 through 11 and symbol 3 (used for retransmission) of the first slot may be used for block index 2, symbols 2 through 5 and symbol 0 (used for retransmission) of a second slot may be used for block index 3, and symbols 6 through 9 and symbol 1 (used for retransmission) of the second slot may be used for block index 4.

In some aspects, symbols 4 through 7 and symbol 12 (used for retransmission) of a first slot may be used for block index 1, symbols 8 through 11 and symbol 13 (used for retransmission) of the first slot may be used for block index 2, symbols 2 through 5 and symbol 0 (used for retransmission) of a second slot may be used for block index 3, and symbols 6 through 9 and symbol 1 (used for retransmission) of the second slot may be used for block index 4.

In some aspects, symbols 4 through 7 and symbol 3 (used for retransmission) of a first slot may be used for block index 1, symbols 8 through 11 and symbol 12 (used for retransmission) of the first slot may be used for block index 2, symbols 2 through 5 and symbol 1 (used for retransmission) of a second slot may be used for block index 3, and symbols 6 through 9 and symbol 10 (used for retransmission) of the second slot may be used for block index 4.

In some aspects, symbols 4 through 7 and symbols 2 and 3 (used for retransmission) of a first slot may be used for block index 1, symbols 8 through 11 and symbols 12 and 13 (used for retransmission) of the first slot may be used for block index 2, symbols 2 through 5 and symbols 0 and 1 (used for retransmission) of a second slot may be used for block index 3, and symbols 6 through 9 and symbols 10 and 11 (used for retransmission) of the second slot may be used for block index 4.

In some aspects, symbols 4 through 7 and symbols 12 and 13 (used for retransmission) of a first slot may be used for block index 1, symbols 8 through 11 and symbols 0 and 1 of a second slot (used for retransmission) may be used for block index 2, symbols 2 through 5 and symbols 10 and 11 (used for retransmission) of the second slot may be used for block index 3, and symbols 6 through 9 and symbols 12 and 13 (used for retransmission) of the second slot may be used for block index 4.

At a subcarrier spacing of 240 kHz, eight SS/PBCH blocks provided by eight beams can be used to perform synchronization across four slots. Various locations of repetition resources for such a case are described in turn below.

In some aspects, symbols 8 through 11 of a first slot, as well as symbols 4 and 5 of the first slot (used for retransmission), may be used for block index 1. Symbols 12 and 13 of the first slot, symbols 0 and 1 of a second slot, and symbols 6 and 7 of the first slot (used for retransmission), may be used for block index 2. Symbols 2 through 5 of the second slot, as well as symbols 10 and 11 of the second slot (used for retransmission), may be used for block index 3. Symbols 6 through 9 of the second slot, as well as symbols 12 and 13 of the second slot (used for retransmission), may be used for block index 4. Symbols 4 through 7 of a third slot, as well as symbols 0 and 1 of the third slot (used for retransmission), may be used for block index 5. Symbols 8 through 11 of the third slot, as well as symbols 2 and 3 of the third slot (used for retransmission), may be used for block index 6. Symbols 12 and 13 of the third slot, as well as symbols 0 and 1 of a fourth slot, and symbols 6 and 7 of the fourth slot (used for retransmission), may be used for block index 7. Finally, symbols 2 through 5 of the fourth slot, as well as symbols 8 and 9 of the fourth slot (used for retransmission), may be used for block index 8.

In some aspects, symbols 8 through 11 of a first slot, as well as symbols 4 and 5 of the first slot (used for retransmission), may be used for block index 1. Symbols 12 and 13 of the first slot, symbols 0 and 1 of a second slot, and symbols 6 and 7 of the first slot (used for retransmission), may be used for block index 2. Symbols 2 through 5 of the second slot, as well as symbols 10 and 11 of the second slot (used for retransmission), may be used for block index 3. Symbols 6 through 9 of the second slot, as well as symbols 12 and 13 of the second slot (used for retransmission), may be used for block index 4. Symbols 4 through 7 of a third slot, as well as symbols 6 and 7 of a fourth slot (used for retransmission), may be used for block index 5. Symbols 8 through 11 of the third slot, as well as symbols 8 and 9 of the fourth slot (used for retransmission), may be used for block index 6. Symbols 12 and 13 of the third slot, as well as symbols 0 and 1 of a fourth slot, and symbols 10 and 11 of the fourth slot (used for retransmission), may be used for block index 7. Finally, symbols 2 through 5 of the fourth slot, as well as symbols 12 and 13 of the fourth slot (used for retransmission), may be used for block index 8.

In some aspects, symbols 8 through 11 of a first slot, as well as symbols 10 and 11 of a second slot (used for retransmission), may be used for block index 1. Symbols 12 and 13 of the first slot, symbols 0 and 1 of a second slot, and symbols 12 and 13 of the second slot (used for retransmission), may be used for block index 2. Symbols 2 through 5 of the second slot, as well as symbols 0 and 1 of a third slot (used for retransmission), may be used for block index 3. Symbols 6 through 9 of the second slot, as well as symbols 2 and 3 of the third slot (used for retransmission), may be used for block index 4. Symbols 4 through 7 of the third slot, as well as symbols 6 and 7 of the fourth slot (used for retransmission), may be used for block index 5. Symbols 8 through 11 of the third slot, as well as symbols 8 and 9 of the fourth slot (used for retransmission), may be used for block index 6. Symbols 12 and 13 of the third slot, as well as symbols 0 and 1 of a fourth slot, and symbols 10 and 11 of the fourth slot (used for retransmission), may be used for block index 7. Finally, symbols 2 through 5 of the fourth slot, as well as symbols 12 and 13 of the fourth slot (used for retransmission), may be used for block index 8.

In some aspects, symbols 8 through 11 of a first slot, as well as symbols 2 and 3 of the first slot (used for retransmission), may be used for block index 1. Symbols 12 and 13 of the first slot, symbols 0 and 1 of a second slot, and symbols 4 and 5 of the first slot (used for retransmission), may be used for block index 2. Symbols 2 through 5 of the second slot, as well as symbols 6 and 7 of the first slot (used for retransmission), may be used for block index 3. Symbols 6 through 9 of the second slot, as well as symbols 10 and 11 of the second slot (used for retransmission), may be used for block index 4. Symbols 4 through 7 of a third slot, as well as symbols 2 and 3 of the third slot (used for retransmission), may be used for block index 5. Symbols 8 through 11 of the third slot, as well as symbols 6 and 7 of a fourth slot (used for retransmission), may be used for block index 6. Symbols 12 and 13 of the third slot, as well as symbols 0 and 1 of a fourth slot, and symbols 8 and 9 of the fourth slot (used for retransmission), may be used for block index 7. Finally, symbols 2 through 5 of the fourth slot, as well as symbols 10 and 11 of the fourth slot (used for retransmission), may be used for block index 8.

In some aspects, symbols 8 through 11 of a first slot, as well as symbol 4 of the first slot (used for retransmission), may be used for block index 1. Symbols 12 and 13 of the first slot, symbols 0 and 1 of a second slot, and symbol 5 of the first slot (used for retransmission), may be used for block index 2. Symbols 2 through 5 of the second slot, as well as symbol 6 of the first slot (used for retransmission), may be used for block index 3. Symbols 6 through 9 of the second slot, as well as symbol 7 of the first slot (used for retransmission), may be used for block index 4. Symbols 4 through 7 of a third slot, as well as symbol 6 of the fourth slot (used for retransmission), may be used for block index 5. Symbols 8 through 11 of the third slot, as well as symbol 7 of the fourth slot (used for retransmission), may be used for block index 6. Symbols 12 and 13 of the third slot, as well as symbols 0 and 1 of a fourth slot, and symbol 8 of the fourth slot (used for retransmission), may be used for block index 7. Finally, symbols 2 through 5 of the fourth slot, as well as symbol 9 of the fourth slot (used for retransmission), may be used for block index 8.

In some aspects, a minimum bandwidth of the low-cost UE 120 may be equal to or less than a minimum bandwidth of a non-low-cost UE (e.g., a 5G UE) (e.g., 20 RBs). For example, the minimum bandwidth of the low-cost UE 120 may be 12 RBs, 10 RBs, 6 RBs, 5 RBs, or a different number of RBs.

In some aspects, an uplink bandwidth of a low-cost UE 120 may be equal to a downlink bandwidth of the low-cost UE 120. In some aspects, the uplink bandwidth may be different than the downlink bandwidth. For example, the downlink bandwidth may be wider than the uplink bandwidth in a sub-6 GHz band. As another example, the uplink bandwidth may be wider than the downlink bandwidth in the sub-6 GHz band and the downlink bandwidth may be wider than the uplink bandwidth in the band above 6 GHz. Notably, a minimum bandwidth of the low-cost UE 120, expressed in MHz, is different for different bands due to the different numerologies of the different bands.

As indicated above, FIG. 6 is provided as an example. Other examples are possible and may differ from what was described with respect to FIG. 6.

FIG. 7 is a diagram illustrating an example 700 of slot selection for retransmission of a broadcast channel and/or synchronization signal. As shown by reference number 702, FIG. 7 shows examples of determining a number of slots in which to repeat an SS/PBCH block for a low-cost UE 120. A frequency band may be associated with a maximum number of PBCH block repetitions in a 5 ms window, denoted L. For example, and as shown by reference number 704, a frequency band with a 15 kHz subcarrier spacing may have an L value of 4 when two slots, each including 2 SS/PBCH block repetitions, are to be used for PBCH block repetitions. As further shown, a frequency band with a 15 kHz subcarrier spacing may have an L value of 8 in some aspects, and a frequency band with a 30 kHz subcarrier spacing may have an L value of 4 or 8 depending on a maximum number of SS/PBCH blocks in the frequency band. As shown by reference number 706, a frequency band with a 120 kHz subcarrier spacing may have an L value of 64 in some aspects, and, as shown by reference number 708, a frequency band with a 240 kHz subcarrier spacing may have an L value of 64 in some aspects.

A BS 110 may select slots for repetitions of an SS/PBCH block based at least in part on a value l (lowercase L). The value of l may be equal to half of L. For example, for the frequency band shown by reference number 704, l may be equal to 2. Therefore, and as indicated by the red box around the second slot, two repetitions of the SS/PBCH block may be scheduled in the second slot of the 5 ms window. Similarly, where L is equal to 8, two slots each containing 2 repetitions are scheduled, since l is equal to 4 in such a case. Similarly, where L is equal to 64, 16 slots each containing 2 repetitions are scheduled.

In some aspects, a first transmission of an SS/PBCH block and a retransmission may use different antenna ports. Additionally, or alternatively, the first transmission and the retransmission may use different antennas of the same antenna port. Additionally, or alternatively, the first transmission and the retransmission may use different precoder cycling values.

In some aspects, the BS 110 may configure a synchronization signal burst set periodicity of the low-cost UE 120. A synchronization signal burst set includes a set of PBCH blocks associated with a beam sweeping pattern. A synchronization signal burst set periodicity of the low-cost UE 120 may be configurable. For example, a low-cost UE 120 may use a shorter synchronization signal burst set periodicity than a non-low-cost UE to increase a number of repetitions of the set of PBCH blocks. In some aspects, a default periodicity of, for example, 5 ms or 10 ms may be used for initial access of low-cost UEs 120. Additionally, or alternatively, for connected-mode or idle-mode low-cost UEs 120, a short synchronization signal burst set periodicity of, for example, 5 ms, 10 ms, 20 ms, or 40 ms may be used.

As indicated above, FIG. 7 is provided as an example. Other examples are possible and may differ from what was described with respect to FIG. 7.

Figure 8:
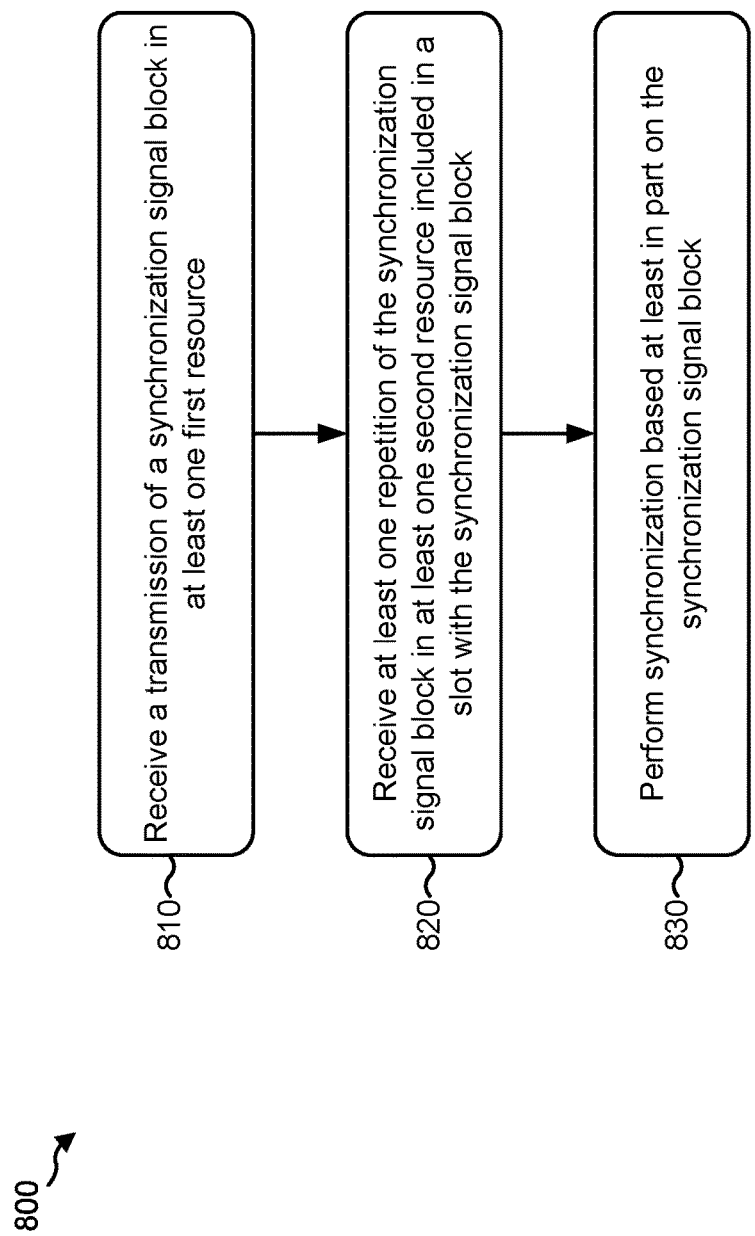
FIG. 8 is a flow chart of a method of wireless communication performed by a UE.

FIG. 8 is a flow chart of a method 800 of wireless communication. The method may be performed by a low-cost UE (e.g., the UE 120 of FIG. 1, the apparatus 1002/1002', and/or the like).

At 810, the low-cost UE may receive a transmission of a synchronization signal block in at least one first resource. For example, the low-cost UE may receive a synchronization signal block. In some aspects, the synchronization signal block may be the SS/PBCH block described herein. For example, the synchronization signal block may include a broadcast channel (e.g., a PBCH) and at least one synchronization signal (e.g., a PSS and/or an SSS). The low-cost UE may receive the synchronization signal block in at least one first resource, as described in connection with FIGS. 5 and 6, above. In some aspects, at least part of the synchronization signal block is equivalent to a block structure as a 5G broadcast channel and/or synchronization signal block for a non-low-cost UE (e.g., a 5G UE).

In some aspects, the low-cost UE operates in a 5G band. In some aspects, a minimum bandwidth of the low-cost UE may include a same number of resource blocks as a minimum bandwidth of a non-low-cost UE. In some aspects, a minimum bandwidth of the low-cost UE may include fewer resource blocks than a minimum bandwidth of a non-low-cost UE.

In some aspects, a bandwidth of the low-cost UE includes a middle half of a bandwidth of a non-low-cost UE, and the bandwidth of the low-cost UE and the bandwidth of the non-low-cost UE share a direct current tone. In some aspects, a bandwidth of the low-cost UE includes an upper half or a lower half of a bandwidth of a non-low-cost UE, and wherein a direct current tone of the low-cost UE is above or below a direct current tone of the non-low-cost UE.

In some aspects, the broadcast channel and/or synchronization signal is in a frequency band, and a subcarrier spacing and cyclic prefix of the frequency band for the low-cost UE is equal to a subcarrier spacing and cyclic prefix of the frequency band for a non-low-cost UE in a 5G Band.

In some aspects, at least part of the synchronization signal block corresponds to a block structure of a 5G synchronization signal block for a non-low-cost UE, and a location of the slot corresponds to a location of the slot for the non-low-cost UE. In some aspects, a minimum bandwidth of the low-cost UE includes a same number of resource blocks or fewer resource blocks in comparison to a minimum bandwidth of a non-low-cost UE. In some aspects, the bandwidth of the low-cost UE is equal to or larger than a bandwidth of the synchronization signal and less than a bandwidth of the broadcast channel.

At 820, the low-cost UE may receive at least one repetition of the synchronization signal block in at least one second resource included in a slot with the synchronization signal block. For example, the low-cost UE may receive at least one repetition of the broadcast channel (e.g., PBCH) or synchronization signal in at least one second resource. Example locations of the at least one second resource are described in connection with FIGS. 5, 6, and 7, above. The at least one second resource may be included in a slot with the synchronization signal block. Additionally, or alternatively, the at least one second resource may be associated with a retransmission of a synchronization signal block (e.g., an SS/PBCH block) that includes the broadcast channel and/or synchronization signal, which may occur in the same slot or a different slot. In some aspects, a location of the slot corresponds to a location of the slot for a non-low-cost UE.

In some aspects, the at least one second resource is contiguous with the broadcast channel and/or synchronization signal block. In some aspects, the at least one second resource is not contiguous with the broadcast channel and/or synchronization signal block. In some aspects, the slot includes multiple, different broadcast channel and/or synchronization signal blocks. In some aspects, one or more other symbols of the slot include at least one of a downlink control channel, an uplink control channel, or a guard period.

In some aspects, the slot is a first slot, and the transmission and the at least one repetition are repeated in one or more second slots. In some aspects, the one or more second slots occur within approximately 5 milliseconds of the first slot. In some aspects, a quantity of the one or more second slots is based at least in part on a maximum number of broadcast channel and/or synchronization signal blocks of a frequency band of the low-cost UE. In some aspects, the transmission and the at least one repetition in the first slot are transmitted using a same transmit beam as the transmission and the at least one repetition in the one or more second slots. In some aspects, the transmission and the at least one repetition in the first slot are transmitted using a same antenna port as the transmission and the at least one repetition in the one or more second slots. In some aspects, a different antenna of the antenna port is used for the transmission than for the at least one repetition in the first slot. In some aspects, a different precoder cycling of the antenna port is used for the transmission than for the at least one repetition in the first slot.

In some aspects, the transmission and the at least one repetition in the first slot are transmitted using a different antenna port than the transmission and the at least one repetition in the one or more second slots. In some aspects, the transmission and the at least one repetition in the first slot include a same broadcast channel as the transmission and the at least one repetition in the one or more second slots. In some aspects, the transmission and the at least one repetition in the first slot include a same reference signal as the transmission and the at least one repetition in the one or more second slots. In some aspects, the transmission and the at least one repetition in the first slot include a same secondary synchronization signal as the transmission and the at least one repetition in the one or more second slots. In some aspects, the transmission and the at least one repetition in the first slot use a different primary synchronization signal than the transmission and the at least one repetition in the one or more second slots.

In some aspects, the synchronization signal block is in a frequency band, and a numerology of the synchronization signal block is based at least in part on the frequency band. In some aspects, the at least one second resource is contiguous with the synchronization signal block. In some aspects, the slot includes multiple, different synchronization signal blocks. In some aspects, one or more other symbols of the slot include at least one of a downlink control channel, an uplink control channel, or a guard period. In some aspects, a synchronization signal burst set periodicity of the synchronization signal block for the low-cost UE is different than a synchronization signal burst set periodicity for a non-low-cost UE.

In some aspects, the slot is a first slot, and the transmission and the at least one repetition are repeated in one or more second slots. In some aspects, the one or more second slots occur within approximately 5 milliseconds of the first slot. In some aspects, a quantity of the one or more second slots is based at least in part on a maximum number of synchronization signal blocks of a frequency band of the low-cost UE. In some aspects, the transmission and the at least one repetition in the first slot, and the transmission and the at least one repetition in the one or more second slots, are transmitted using at least one of a same transmit beam, a same antenna port, or a different antenna port. In some aspects, a different antenna of the same antenna port is used for the transmission than for the at least one repetition in the first slot. In some aspects, a different precoder cycling of the same antenna port is used for the transmission than for the at least one repetition in the first slot. wherein the transmission and the at least one repetition in the first slot, and the transmission and the at least one repetition in the second slot, include at least one of: a same broadcast channel, a same reference signal, a same synchronization signal, or a different primary synchronization signal.

In some aspects, a synchronization signal burst set periodicity of the broadcast channel and/or synchronization signal block for the low-cost UE is different than a synchronization signal burst set periodicity for a non-low-cost UE.

At 830, the low-cost UE may perform synchronization based at least in part on the synchronization signal block. For example, the low-cost UE may identify the base station based at least in part on a PSS, SSS, and/or PBCH of the synchronization signal block. Additionally, or alternatively, the low-cost UE may determine timing information based at least in part on the PSS, SSS, and/or PBCH. By performing multiple repetitions of the PBCH and/or the synchronization signal block, the BS 110 improves coverage of the low-cost UE and improves a likelihood of success of the synchronization.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
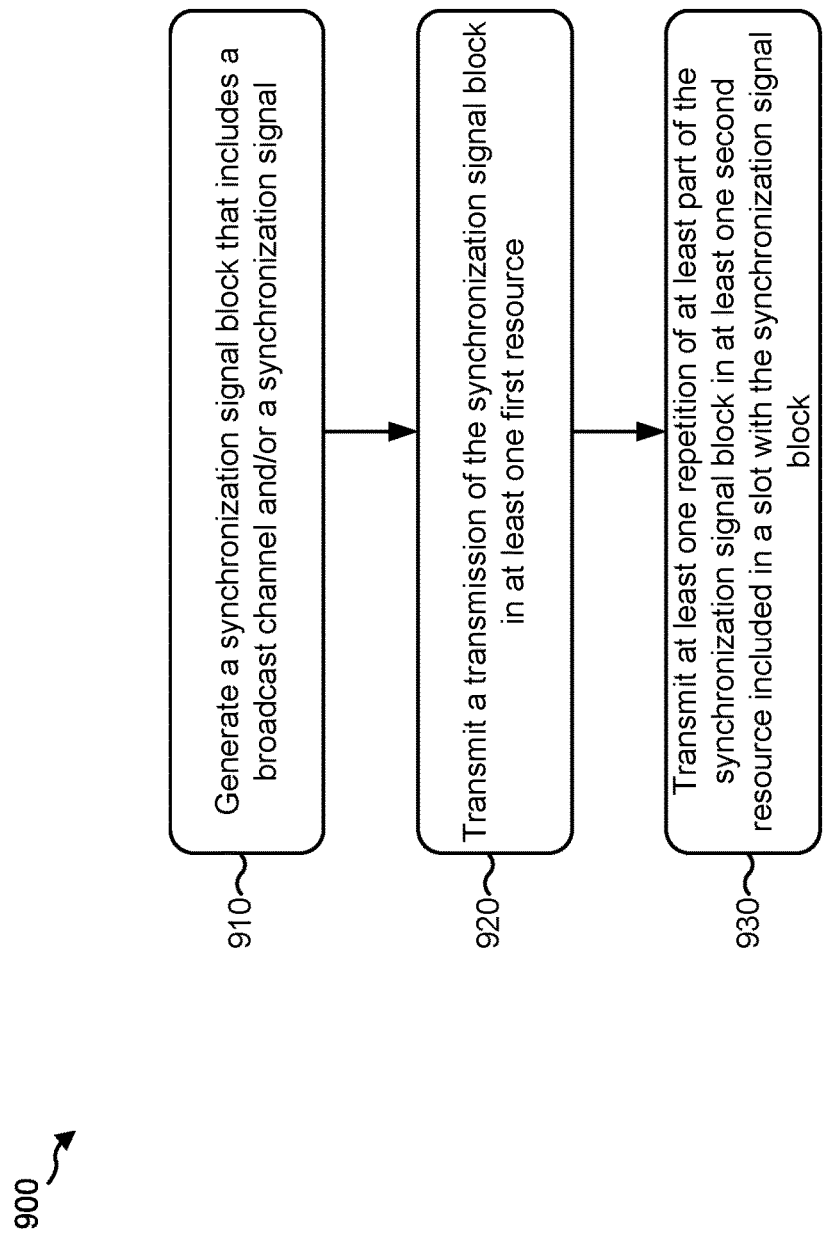
FIG. 9 is another flow chart of a method of wireless communication performed by a base station.

FIG. 9 is a flow chart of a method 900 of wireless communication. The method may be performed by a base station (e.g., the BS 110 of FIG. 1, the apparatus 1202/1202', and/or the like).

At 910, the base station may generate a synchronization signal block that includes a broadcast channel and/or synchronization signal. For example, the base station may generate a broadcast channel (e.g., a PBCH) and/or one or more synchronization signals (e.g., a PSS and/or SSS). The base station may generate a synchronization signal block (e.g., an SS/PBCH block) including the broadcast channel and the one or more synchronization signals.

At 920, the base station may transmit a transmission of the synchronization signal block in at least one first resource. For example, the base station may transmit a synchronization signal block (e.g., an SS/PBCH block) including a broadcast channel (e.g., a PBCH) and at least one synchronization signal (e.g., a PSS and/or an SSS). The base station may transmit the synchronization signal block in at least one first resource, as described in connection with FIGS. 5 and 6, above. In some aspects, at least part of the synchronization signal block is equivalent to a block structure of a 5G broadcast channel and/or synchronization signal block for a non-low-cost UE (e.g., a 5G UE).

In some aspects, the low-cost UE operates in a 5G band. In some aspects, a minimum bandwidth of the low-cost UE may include a same number of resource blocks as a minimum bandwidth of a non-low-cost UE. In some aspects, a minimum bandwidth of the low-cost UE may include fewer resource blocks than a minimum bandwidth of a non-low-cost UE.

In some aspects, the broadcast channel and/or synchronization signal is in a frequency band, and a subcarrier spacing and cyclic prefix of the frequency band for the low-cost UE is equal to a subcarrier spacing and cyclic prefix of the frequency band for a non-low-cost UE in a 5G Band. In some aspects, one or more reserved bits of the broadcast channel and/or synchronization signal indicate configuration information for the low-cost UE.

In some aspects, at least part of the synchronization signal block corresponds to a block structure of a 5G synchronization signal block for a non-low-cost UE, and a location of the slot corresponds to a location of the slot for the non-low-cost UE. In some aspects, a minimum bandwidth of the low-cost UE includes a same number of resource blocks or fewer resource blocks in comparison to a minimum bandwidth of a non-low-cost UE. In some aspects, the bandwidth of the low-cost UE is equal to or larger than a bandwidth of the synchronization signal and less than a bandwidth of the broadcast channel.

At 930, the base station may transmit at least one repetition of at least part of the synchronization signal block in at least one second resource included in a slot with the synchronization signal block. For example, the base station may transmit at least one repetition of the broadcast channel (e.g., PBCH) or synchronization signal in at least one second resource. Example locations of the at least one second resource are described in connection with FIGS. 5, 6, and 7, above. The at least one second resource may be included in a slot with the synchronization signal block. Additionally, or alternatively, the at least one second resource may be associated with a retransmission of a synchronization signal block that includes the broadcast channel and/or synchronization signal, which may occur in the same slot or a different slot. In some aspects, a location of the slot is equal to a location of the slot for a non-low-cost UE.

In some aspects, the at least one second resource is contiguous with the broadcast channel and/or synchronization signal block. In some aspects, the at least one second resource is not contiguous with the broadcast channel and/or synchronization signal block. In some aspects, the slot includes multiple, different broadcast channel and/or synchronization signal blocks. In some aspects, one or more other symbols of the slot include at least one of a downlink control channel, an uplink control channel, or a guard period.

In some aspects, the slot is a first slot, and the transmission and the at least one repetition are repeated in one or more second slots. In some aspects, the one or more second slots occur within approximately 5 milliseconds of the first slot. In some aspects, a quantity of the one or more second slots is based at least in part on a maximum number of broadcast channel and/or synchronization signal blocks of a frequency band of the low-cost UE. In some aspects, the transmission and the at least one repetition in the first slot are transmitted using a same transmit beam as the transmission and the at least one repetition in the one or more second slots. In some aspects, the transmission and the at least one repetition in the first slot are transmitted using a same antenna port as the transmission and the at least one repetition in the one or more second slots. In some aspects, a different antenna of the antenna port is used for the transmission than for the at least one repetition in the first slot. In some aspects, a different precoder cycling of the antenna port is used for the transmission than for the at least one repetition in the first slot.

In some aspects, the transmission and the at least one repetition in the first slot are transmitted using a different antenna port than the transmission and the at least one repetition in the one or more second slots. In some aspects, the transmission and the at least one repetition in the first slot include a same broadcast channel as the transmission and the at least one repetition in the one or more second slots. In some aspects, the transmission and the at least one repetition in the first slot include a same reference signal as the transmission and the at least one repetition in the one or more second slots. In some aspects, the transmission and the at least one repetition in the first slot include a same secondary synchronization signal as the transmission and the at least one repetition in the one or more second slots. In some aspects, the transmission and the at least one repetition in the first slot use a different primary synchronization signal than the transmission and the at least one repetition in the one or more second slots.

In some aspects, a synchronization signal burst set periodicity of the broadcast channel and/or synchronization signal block for the low-cost UE is different than a synchronization signal burst set periodicity for a non-low-cost UE.

In some aspects, the synchronization signal block is in a frequency band, and a numerology of the synchronization signal block is based at least in part on the frequency band. In some aspects, the at least one second resource is contiguous with the synchronization signal block. In some aspects, the slot includes multiple, different synchronization signal blocks. In some aspects, one or more other symbols of the slot include at least one of a downlink control channel, an uplink control channel, or a guard period. In some aspects, a synchronization signal burst set periodicity of the synchronization signal block for the low-cost UE is different than a synchronization signal burst set periodicity for a non-low-cost UE.

In some aspects, the slot is a first slot, and the transmission and the at least one repetition are repeated in one or more second slots. In some aspects, the one or more second slots occur within approximately 5 milliseconds of the first slot. In some aspects, a quantity of the one or more second slots is based at least in part on a maximum number of synchronization signal blocks of a frequency band of the low-cost UE. In some aspects, the transmission and the at least one repetition in the first slot, and the transmission and the at least one repetition in the one or more second slots, are transmitted using at least one of a same transmit beam, a same antenna port, or a different antenna port. In some aspects, a different antenna of the same antenna port is used for the transmission than for the at least one repetition in the first slot. In some aspects, a different precoder cycling of the same antenna port is used for the transmission than for the at least one repetition in the first slot. wherein the transmission and the at least one repetition in the first slot, and the transmission and the at least one repetition in the second slot, include at least one of: a same broadcast channel, a same reference signal, a same synchronization signal, or a different primary synchronization signal.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
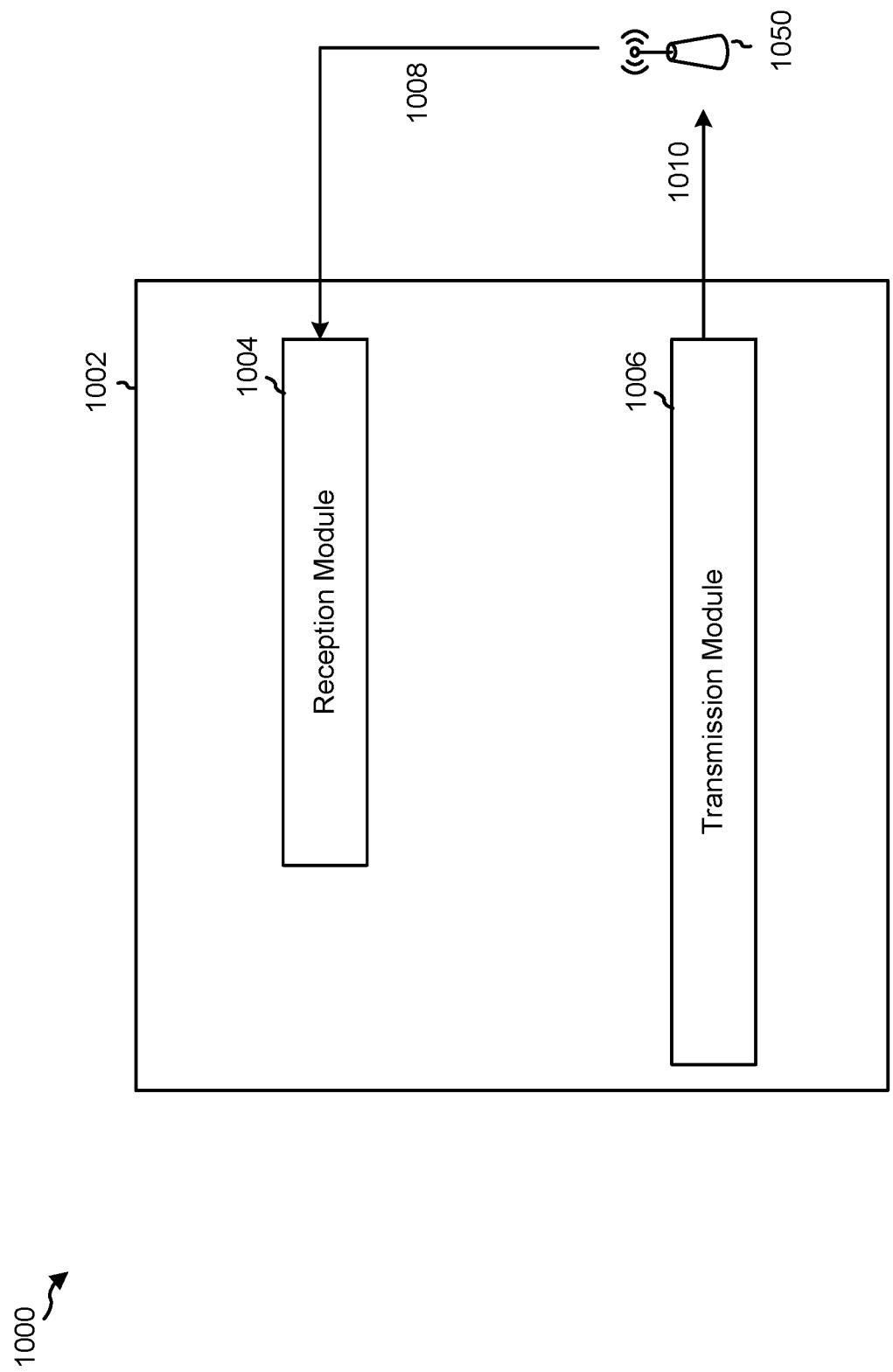
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a low-cost UE. In some aspects, the apparatus 1002 includes a reception module 1004 and/or a transmission module 1006.

The reception module 1004 may receive data 1008 from a base station 1050 (e.g., a BS 110. The data 1008 may include a receiving a transmission of a synchronization signal block in at least one first resource, wherein the synchronization signal block comprises at least one of a broadcast channel or a synchronization signal. The data 1008 may further include at least one repetition of at least a part of the synchronization signal block in at least one second resource, wherein the at least one second resource is included in a slot with the synchronization signal block, and wherein the at least one second resource is a configured resource. In some aspects, the reception module 1004 may additionally receive the transmission and the at least one repetition in one or more second slots. In such a case, the first slot may be received by the reception module 1004 using a same transmit beam, a same antenna port, a different antenna port, a different antenna of the same antenna port, or a different precoder cycling than the second slot. The reception module 1004 may provide information identifying the transmission and the at least one repetition to another module or layer of the apparatus 1002, which may perform synchronization according to the transmission and the at least one repetition.

The transmission module 1006 may provide data 1010 to the base station 1050. The data 1010 may include, for example, configuration information regarding the apparatus 1002 for configuration of the transmission and the at least one reception and/or the like.

The apparatus may include additional modules that perform each of the blocks of the algorithm in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
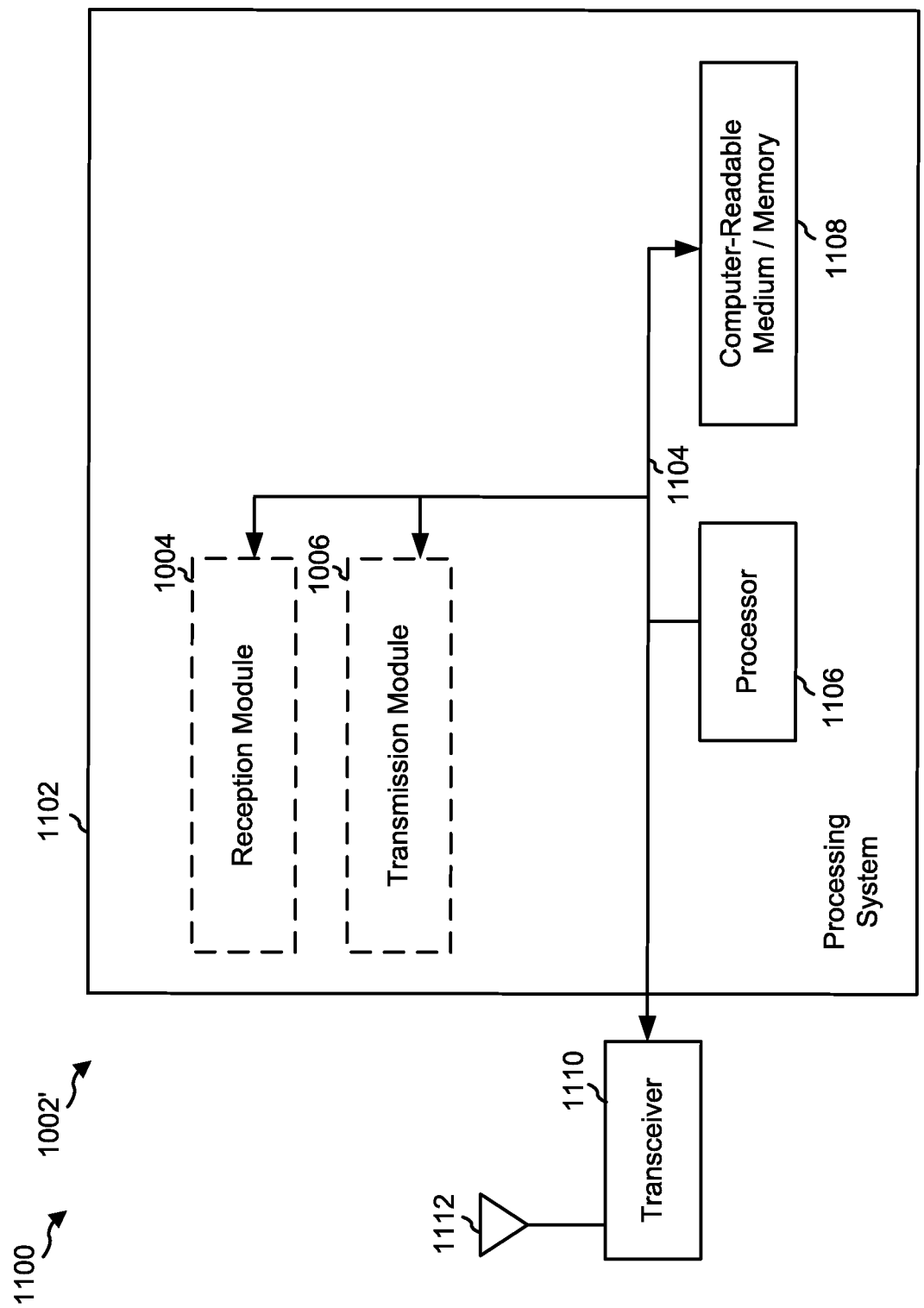
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a low-cost UE.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1104, 1106, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1006, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004 and 1006. The modules may be software modules running in the processor 1106, resident/stored in the computer readable medium/memory 1108, one or more hardware modules coupled to the processor 1106, or some combination thereof. The processing system 1102 may be a component of the UE 120 and may include the memory 282 and/or at least one of the TX MIMO processor 266, the receive processor 258, and/or the controller/processor 280.

In some aspects, the apparatus 1002/1002' for wireless communication includes means for receiving a transmission of a synchronization signal block in at least one first resource and means for receiving at least one repetition of the synchronization signal block in at least one second resource, wherein the at least one second resource is included in a slot with the synchronization signal block, and wherein the at least one second resource is a configured resource. The aforementioned means may be one or more of the aforementioned modules of the apparatus 1002 and/or the processing system 1102 of the apparatus 1002' configured to perform the functions recited by the aforementioned means. As described supra, the processing system 1102 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 11 is provided as an example. Other examples are possible and may differ from what was described in connection with FIG. 11.

Figure 12:
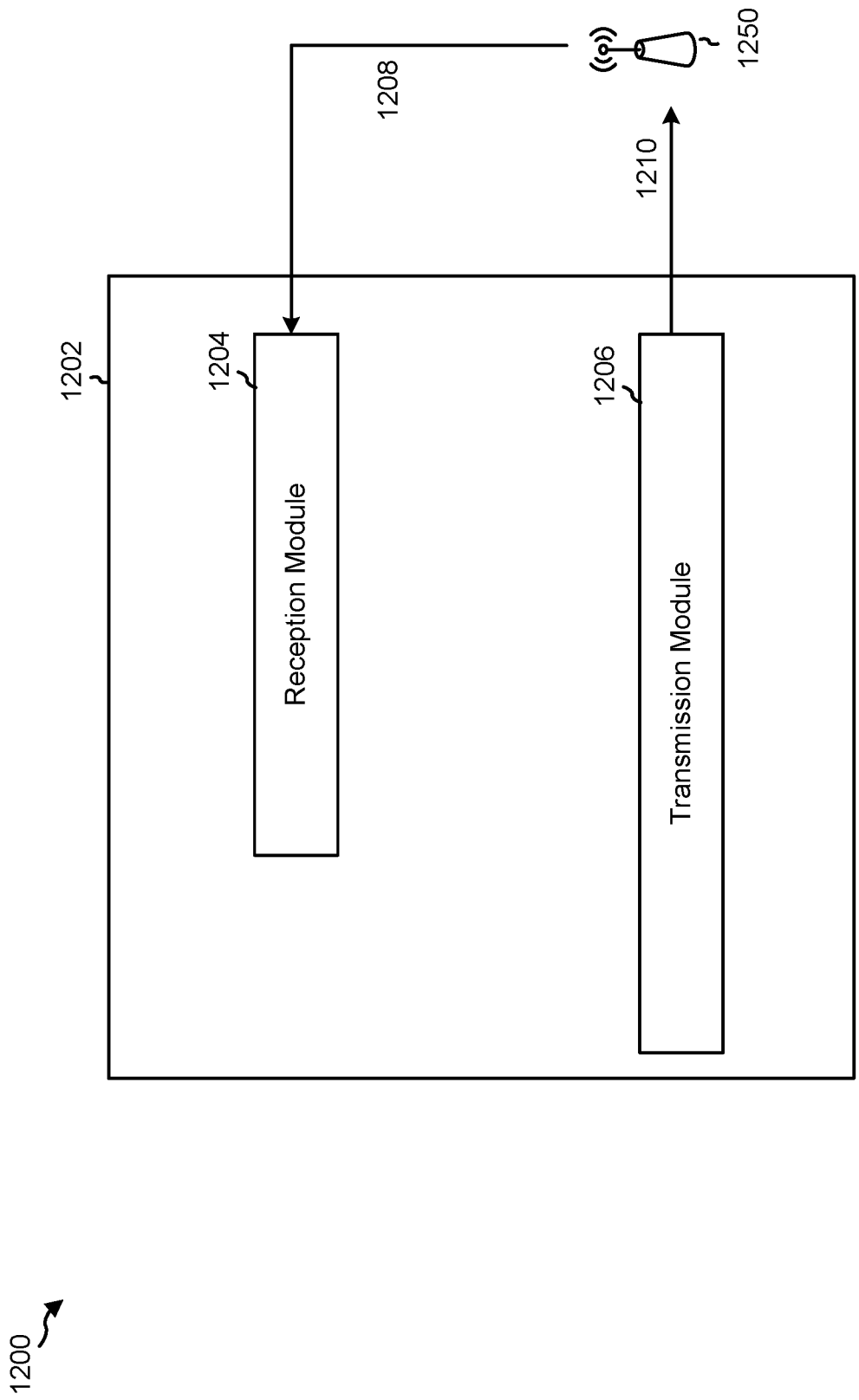
FIG. 12 is a conceptual data flow diagram illustrating the data flow between different modules/means/components in an example apparatus.

FIG. 12 is a conceptual data flow diagram 1200 illustrating the data flow between different modules/means/components in an example apparatus 1202. The apparatus 1202 may be a base station. In some aspects, the apparatus 1202 includes a reception module 1204 and/or a transmission module 1206.

The reception module 1204 may receive data 1208 from a UE 1250 (e.g., the UE 120, a low-cost UE 120, etc.). The data 1208, for example, may include feedback information or other information provided by the UE 1250. The transmission module 1206 may transmit data 1210 to the UE 1250. The data 1210 may include a transmission of a synchronization signal block, wherein the synchronization signal block comprises at least one of a broadcast channel or a synchronization signal. In some aspects, the data 1210 may include at least one repetition of at least a part of the synchronization signal block in at least one second resource, wherein the at least one second resource is included in a slot with the synchronization signal block, and wherein the at least one second resource is a configured resource. In some aspects, the transmission and the at least one repetition may be transmitted in a first slot, and may be repeated in a second slot. In such a case, the transmission module 1206 may transmit the transmission and the at least one repetition in the first slot, and the transmission and the at least one repetition in the one or more second slots, using at least one of a same transmit beam, a same antenna port, a different antenna port, a different antenna of the same antenna port, and/or the like.

The apparatus may include additional modules that perform each of the blocks of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
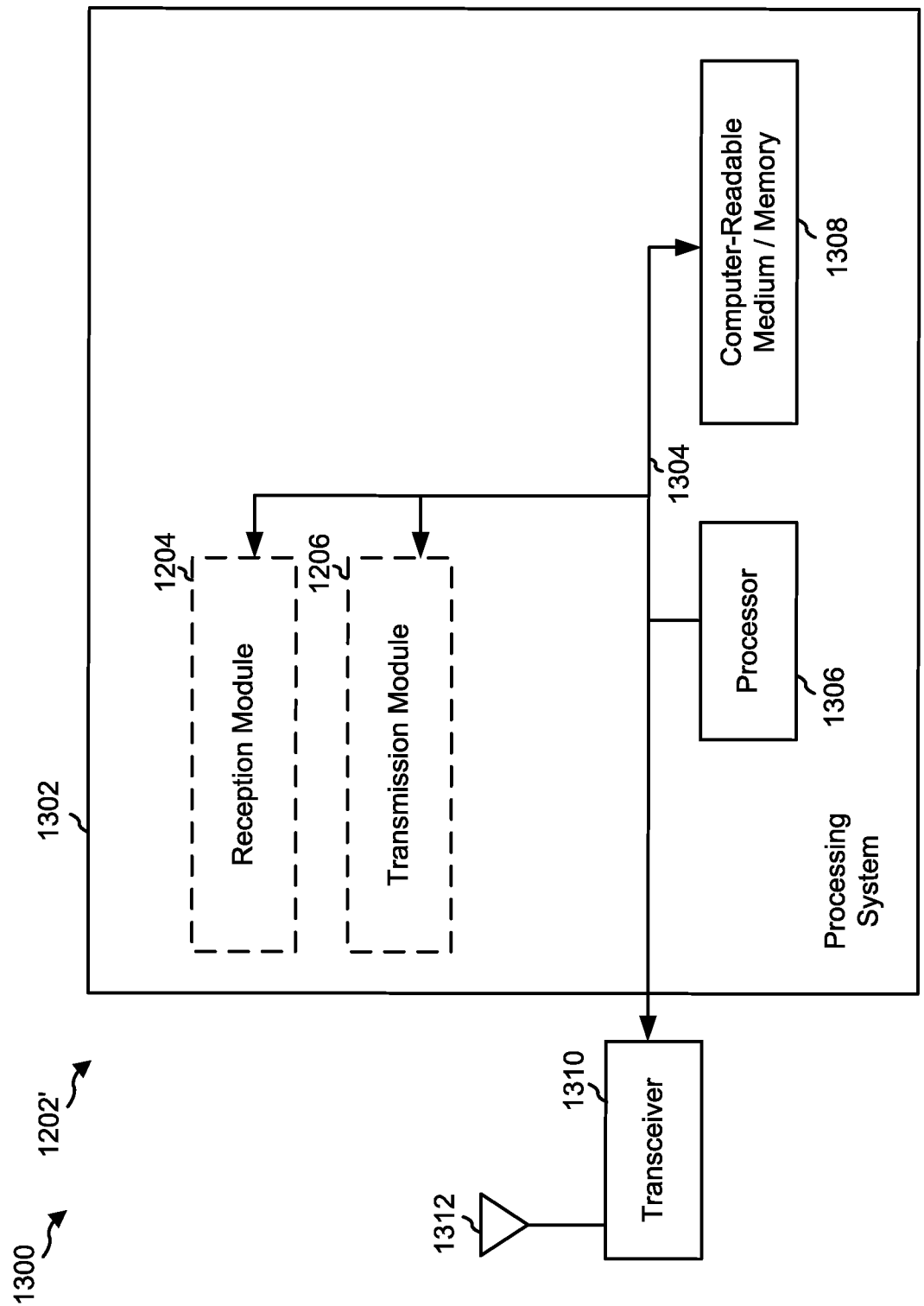
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a base station.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, and the computer-readable medium/memory 1308. The bus 1304 may also link various other circuits such as timing sources, peripherals, voltage regulators, and power management circuits, which are well known in the art, and therefore, will not be described any further.

The processing system 1302 may be coupled to a transceiver 1310. The transceiver 1310 is coupled to one or more antennas 1312. The transceiver 1310 provides a means for communicating with various other apparatus over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1206, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described supra for any particular apparatus. The computer-readable medium/memory 1308 may also be used for storing data that is manipulated by the processor 1306 when executing software. The processing system further includes at least one of the modules 1204 and 1206. The modules may be software modules running in the processor 1306, resident/stored in the computer readable medium/memory 1308, one or more hardware modules coupled to the processor 1306, or some combination thereof. The processing system 1302 may be a component of the base station 110 and may include the memory 242 and/or at least one of the TX MIMO processor 230, the receive processor 238, and/or the controller/processor 240.

In some aspects, the apparatus 1202/1202' for wireless communication includes means for transmitting, for a machine type communication (MTC) user equipment (UE), a transmission of a synchronization signal block in at least one first resource; and means for transmitting, for the low-cost UE, at least one repetition of the synchronization signal block in at least one second resource, wherein the at least one second resource is included in a slot with the synchronization signal block, wherein the at least one second resource is a configured resource. The aforementioned means may be one or more of the aforementioned modules of the apparatus 1202 and/or the processing system 1302 of the apparatus 1202' configured to perform the functions recited by the aforementioned means. As described supra, the processing system 1302 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 13 is provided as an example. Other examples are possible and may differ from what was described in connection with FIG. 13.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving a transmission of a synchronization signal block in at least one first resource, wherein the synchronization signal block comprises at least one of a broadcast channel or a synchronization signal; and
   receiving at least one repetition of at least a part of the synchronization signal block in at least one second resource, wherein the at least one second resource is included in a slot with the synchronization signal block, and wherein the at least one second resource is a configured resource.

2. The method of claim 1, wherein at least part of the synchronization signal block corresponds to a block structure of a synchronization signal block for a different type of UE, and wherein a location of the slot corresponds to a location of the slot for the different type of UE.

3. The method of claim 1 wherein a minimum bandwidth associated with the UE includes a same number of resource blocks or fewer resource blocks in comparison to a minimum bandwidth of a different type of UE.

4. The method of claim 1, wherein a bandwidth associated with the UE is equal to or larger than a bandwidth of the synchronization signal and less than a bandwidth of the broadcast channel.

5. The method of claim 1, wherein the synchronization signal block is in a frequency band, and wherein a numerology of the synchronization signal block is based at least in part on the frequency band.

6. The method of claim 1, wherein the at least one second resource is contiguous with the synchronization signal block.

7. The method of claim 1, wherein the slot includes multiple, different synchronization signal blocks.

8. The method of claim 1, wherein one or more other symbols of the slot include at least one of a downlink control channel, an uplink control channel, or a guard period.

9. The method of claim 1, wherein the slot is a first slot, and wherein the transmission and the at least one repetition are repeated in one or more second slots.

10. The method of claim 9, wherein the one or more second slots occur within approximately 5 milliseconds of the first slot.

11. The method of claim 9, wherein a quantity of the one or more second slots is based at least in part on a maximum number of synchronization signal blocks of a frequency band of the UE.

12. The method of claim 9, wherein the transmission and the at least one repetition in the first slot, and the transmission and the at least one repetition in the one or more second slots, are transmitted using at least one of:
 a same transmit beam,
 a same antenna port, or
 a different antenna port.

13. The method of claim 12, wherein a different antenna of the same antenna port is used for the transmission than for the at least one repetition in the first slot.

14. The method of claim 12, wherein a different precoder cycling of the same antenna port is used for the transmission than for the at least one repetition in the first slot.

15. The method of claim 9, wherein the transmission and the at least one repetition in the first slot, and the transmission and the at least one repetition in the one or more second slots, include at least one of:
 a same broadcast channel,
 a same reference signal,
 a same synchronization signal, or
 a different primary synchronization signal.

16. The method of claim 1, wherein a synchronization signal burst set periodicity of the synchronization signal block for the UE is different than a synchronization signal burst set periodicity for a different type of UE.

17. A method of wireless communication performed by a base station, comprising:
 transmitting, for a user equipment (UE), a transmission of a synchronization signal block, wherein the synchronization signal block comprises at least one of a broadcast channel or a synchronization signal; and
 transmitting, for the UE, at least one repetition of at least a part of the synchronization signal block in at least one second resource, wherein the at least one second resource is included in a slot with the synchronization signal block, and wherein the at least one second resource is a configured resource.

18. The method of claim 17, wherein at least part of the synchronization signal block corresponds to a block structure of a synchronization signal block for a different type of UE, and wherein a location of the slot corresponds to a location of the slot for the different type of UE.

19. The method of claim 17, wherein the synchronization signal block is in a frequency band, and wherein a numerology of the synchronization signal block is based at least in part on the frequency band.

20. The method of claim 17, wherein the slot includes multiple, different synchronization signal blocks.

21. The method of claim 17, wherein the slot is a first slot, and wherein the transmission and the at least one repetition are repeated in one or more second slots.

22. The method of claim 21, wherein the one or more second slots occur within approximately 5 milliseconds of the first slot.

23. The method of claim 21, wherein the transmission and the at least one repetition in the first slot, and the transmission and the at least one repetition in the one or more second slots, are transmitted using at least one of:
 a same transmit beam,
 a same antenna port, or
 a different antenna port.

24. The method of claim 23, wherein a different antenna of the same antenna port is used for the transmission than for the at least one repetition in the first slot.

25. The method of claim 23, wherein the transmission and the at least one repetition in the first slot, and the transmission and the at least one repetition in the one or more second slots, include at least one of:
 a same broadcast channel,
 a same reference signal,
 a same synchronization signal, or
 a different primary synchronization signal.

26. A user equipment (UE), comprising:
 a memory; and
 at least one processor coupled to the memory, the at least one processor configured to:
  receive a transmission of a synchronization signal block in at least one first resource, wherein the synchronization signal block comprises at least one of a broadcast channel or a synchronization signal; and
  receive at least one repetition of at least a part of the synchronization signal block in at least one second resource, wherein the at least one second resource is included in a slot with the synchronization signal block, and wherein the at least one second resource is a configured resource.

27. The UE of claim 26, wherein at least part of the synchronization signal block corresponds to a block structure of a synchronization signal block for a different type of UE, and wherein a location of the slot corresponds to a location of the slot for the different type of UE.

28. The UE of claim 26, wherein the slot includes multiple, different synchronization signal blocks.

29. A base station for wireless communication, comprising:
 a memory; and
 at least one processor coupled to the memory, the at least one processor being configured to:
  transmit, for a user equipment (UE), a transmission of a synchronization signal block, wherein the synchronization signal block comprises at least one of a broadcast channel or a synchronization signal; and
  transmit, for the UE, at least one repetition of at least a part of the synchronization signal block in at least one second resource, wherein the at least one second resource is included in a slot with the synchronization signal block, and wherein the at least one second resource is a configured resource.

30. The base station of claim 29, wherein the slot is a first slot, and wherein the transmission and the at least one repetition are repeated in one or more second slots.

* * * * *